Figure 1:
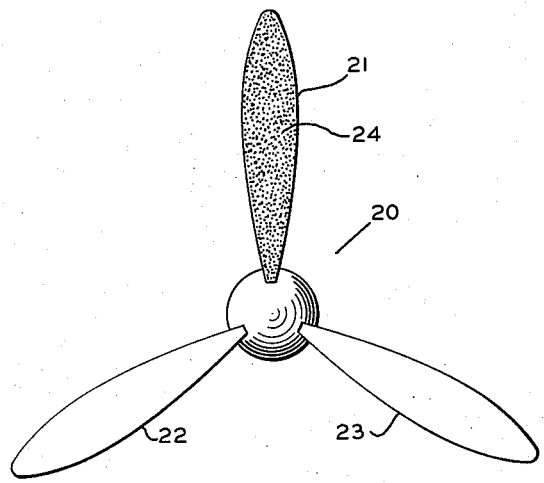

Dec. 22, 1959  O. HALPERN  2,918,671
IDENTIFYING REFLECTOR WITH REFLECTION DISSYMMETRY
Filed Jan. 15, 1946

INVENTOR
OTTO HALPERN
BY
*M.C. Hayes*
ATTORNEY

United States Patent Office 2,918,671
Patented Dec. 22, 1959

2,918,671

IDENTIFYING REFLECTOR WITH REFLECTION DISSYMMETRY

Otto Halpern, Pacific Palisades, Calif., assignor, by mesne assignments, to the United States of America as represented by the Secretary of the Navy Application January 15, 1946, Serial No. 641,352

9 Claims. (Cl. 343—18)

This invention relates to a rotary mechanical system and more particularly to such a system having subharmonic reflection frequencies of incident microwave radiation introduced therein by providing an electrical dissymmetry between otherwise quasi-identical elements of the system which is responsive to a preselected wavelength of the incident microwave radiation in order to provide a recognition signal for identifying the system.

In the operation of radar equipment it is desirable to be able to identify a target appearing upon the screen of the indicator scope in order to quickly determine whether such target be friend or enemy, and more particularly to be able to distinguish between targets. This invention provides a novel method for identifying a rotating mechanical system by applying a coating of material which causes that portion of the system covered by such coating to be non-reflective of incident radio microwave radiation of a preselected wavelength, thereby modulating the reflected radiation and introducing subharmonic reflection frequencies which may be used as a means of identification.

An object of this invention is to provide a novel means for introducing subharmonic reflection frequencies of radio microwave radiation into a normally symmetrical mechanical rotating system in order to identify the system.

Another object of this invention is to provide a rotating mechanical system with means for automatically modulating the reflection frequency of incident radio microwave radiation impinging thereupon as a means for identifying the system.

A further object of this invention is to provide a rotating mechanical system having a portion thereof provided with a coating of material which is non-reflective of incident radio microwave radiation of a preselected wavelength.

A still further object of this invention is to provide a rotating mechanical system with means responsive to a preselected wavelength of incident radio microwave radiation for introducing an electrical dissymmetry between otherwise substantially identical elements of the rotating system.

A particular object of this invention is to provide an aircraft propeller having means responsive to a preselected wavelength of incident radio microwave radiation for introducing an electrical dissymmetry between otherwise substantially identical elements of the propeller.

A more particular object of this invention is to provide an aircraft propeller having a portion thereof coated with a layer of material which is non-reflective of incident radio microwave radiation of a preselected wavelength.

Further objects and advantages of this invention, as well as its construction, arrangement, and operation, will be apparent from the following description and claims in connection with the accompanying drawing, in which, Fig. 1 is a front view of an aircraft propeller constructed in accordance with the principles of this invention.

Figure 2:
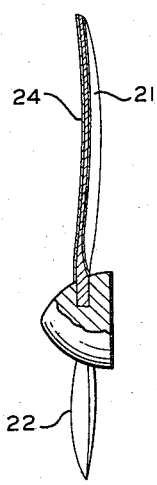

Fig. 2 is a side view, partly in section of the propeller illustrated in Fig. 1.

It is well known that radar signals (radio microwave radiation) reflected by moving objects show intensity modulation which has characteristic and more or less constant frequencies. For example, radar signals reflected from a three-bladed propeller of a single-engine airplane shows a modulation which has a frequency equal to three (number of blades) times the propeller shaft frequency and its harmonics. It is to be noted that the lowest modulation frequency is always a multiple of the lowest mechanical frequency present in the rotating system. Thus, a shaft frequency of twenty cycles per second on a three-bladed propeller leads to a lowest modulation frequency of sixty cycles per second. This fact is due to the almost complete physical and electrical identity of the individual blades of the propeller, which causes a complete period to appear for every one-third revolution thereof.

It has previously been considered that radar signals might be mechanically modulated as a means of identifying a mechanical system. This might be accomplished by making one blade of the propeller of wood and the remaining blades of metal. This method, however, is subject to the disadvantage of lack of security and the ease with which it could be copied by an enemy. That is, the modulation is independent of the microwave radiation frequency being used and could therefore be detected by many types of reception systems.

This invention comprises the introduction of an electrical dissymmetry between otherwise substantially identical elements of the rotating system which is effective only at a preselected wavelength or band of wavelengths of incident radio microwave radiation impinging upon the system. This is accomplished by making a portion (such as one or two blades) of a multibladed propeller less reflective of incident microwave radiation than the rest of the system. The artificial dissymmetry thus introduced will lead to new frequencies in the observed spectrum which are subharmonics of the normal modulation frequencies. A three-bladed propeller with a twenty cycle shaft frequency will thus exhibit a basic twenty cycle modulation frequency by this invention, rather than the normal sixty cycle modulation. This dissymmetry, which is responsive only to a preselected wavelength or band of wavelengths of incident microwave radiation, can be achieved preferably by the use of a material known as Harp material which is applied to a portion of the reflecting surface of the mechanical system, such as a blade of a propeller, as a thin coating having a thickness equal to a quarter wavelength or odd multiple thereof of the preselected wavelength of the incident radiation as measured inside the material. Harp material is composed of innumerable finely divided electrically conductive particles dispersed substantially insulated from each other in a neutral binder. Such finely divided particles preferably include aluminum, graphite, copper, and Permalloy flakes, although other electrically conductive particles may be used. Examples of such binders include waxes, resins, polystyrene, Vistanex, and synthetic rubbers among others. The characteristic property of Harp material is a high dielectric constant, and in the case where ferro-magnetic flakes are used, a high magnetic susceptibility, properties which give a high index of refraction for electro-magnetic waves. Such a material is fully disclosed and described in my copending application Serial Number 581,179, filed in 1945. The physical principle underlying this application is the construction of a coating of material having a high index of refraction and a thickness equal to a quarter-wavelength or odd multiple thereof of the incident microwave radiation for which it is designed to be resonant. Such a coating, being a resonant device, has a reflection coefficient which increases rapidly on both sides of the resonant wavelength. However, there is very little reflection of incident microwave radiation of the wavelength for which the coating is designed to be resonant. It is therefore possible to obtain an arbitrarily sharp resonance effect which is selective to a particular microwave frequency and wavelength.

Referring to the figures, there is shown an aircraft propeller 20 having blades 21, 22, and 23. As shown, blade 21 is coated with a layer of Harp material 24 as heretofore described, the thickness of the layer being equal to a quarter-wavelength, or odd multiple thereof, as measured inside the layer, of the incident radio microwave radiation for which it is designed to be resonant. In this manner an electrical dissymmetry which is effective only at the particular radiation frequency for which the coating is designed to be resonant is introduced between blade 21 and blades 22 and 23. Incident microwave radiation of the frequency of resonance of the Harp material is therefore reflected primarily only by blades 22 and 23, thus introducing subharmonic reflection frequencies which can be detected by a radar receiver and used to identify the rotating mechanical system upon which transmitted microwave radiation is caused to impinge.

In addition to coating a portion of the propeller, such as one or more blades thereof, it may also be desirable to cover a portion of the spinner (propeller hub cowling) with Harp material in order to cause the modulation to remain large at broadside incidence, whereas the propeller modulation normally becomes difficult to observe under this condition. By using Harp material which is anisotropic in the plane of the electric and magnetic vector, it is possible to obtain still further security against detection by the enemy. Likewise, it will readily be understood that various portions of the rotating system may be coated with Harp materials designed to be resonant at different predetermined wavelengths if it should be desired to do so. Inasmuch as the thickness of the coating applied is equal to a quarter-wavelength, as measured inside the coating, of the radiation for which it is designed to be resonant, the small amount of mechanical unbalance introduced has almost a negligible effect upon the dynamic characteristics of the propeller, and any effect which might be introduced can easily be offset by coating the remaining portions of the propeller with a metallic paint designed to have little or no electrical characteristics.

While a particular embodiment of my invention has been disclosed and described, it is to be understood that various modifications and changes may be made in this invention without departing from the spirit and scope thereof as set forth in the appended claims.

What is claimed is:

1. An aircraft propeller having a plurality of metallic blades normally reflecting incident microwave radiation impinging thereupon, having means for selectively minimizing the reflection of microwaves of a preselected wavelength from a sector portion thereof comprising a coating on said portion consisting of a fine dispersion of electrically conducting particles in an insulating binder, said coating having a thickness equal to an odd multiple of one-quarter wavelength of the incident radiation of said preselected wavelength, measured inside said coating.

2. An aircraft propeller having a coating for absorbing incident microwave radiation of a preselected wavelength placed on a sector portion thereof, comprising a fine dispersion of electrically conducting particles in an insulating binder, the thickness of said coating being equal to an odd multiple of one-quarter wavelength of said preselected wavelength as measured inside said coating.

3. An aircraft propeller having a coating of material covering a portion thereof asymmetrical about a rotational axis, said material being non-reflecting of incident microwave radiation of a preselected wavelength.

4. An aircraft propeller having a plurality of blades which are normally reflective to incident microwave radiation, at least one and less than all of said blades having a coating thereon of a material of high dielectric constant of a thickness substantially equal to a quarter-wave length of incident microwave radiation of a preselected frequency as measured within said coating, said coating rendering said coated blade substantially nonreflective to incident microwave energy at said preselected frequency.

5. In combination, an aircraft propeller having a plurality of blades which normally reflect incident microwave radiation impinging thereupon, and a coating on at least one and less than all of said plurality of blades of a material of high dielectric constant for selectively minimizing the reflection therefrom of microwaves of a preselected wave length, said coating being of a thickness equal to a quarter wave length of said incident radiation as measured within said coating.

6. In a radio identification system applicable to an object displaying a rotating element to received radio waves, modulation means comprising selectively reflecting material applied to selected sections of said rotating element, said material having a dielectric constant and a uniform thickness co-selected for mutual cancellation of radiation of predetermined frequency limits reflected from outer and inner surfaces thereof, radiation of other frequencies being normally reflected, whereby reflected radio energy from the object contains modulation components only when the incident radio energy is made to fall within predetermined frequency limits.

7. Reflected radiation moduation means according to claim 6 applied to at least one and less than all blades of a propeller on said object.

8. In a radio identification system for a mechanically rotating member having discrete radial sectors each reflective to radio waves incident thereon, means coating less than all of said sectors with a material of high dielectric constant of thickness essentially one-quarter wave length for radio energy of a selected frequency whereby rotation of said device under illumination by said radio energy modulates the energy reflected therefrom in accordance with interposition of coated and uncoated sectors only at selected frequencies.

9. A coating applied to one of a plurality of propeller blades comprising a dielectric material of thickness measured at one quarter wave length of a preselected frequency of radio energy passing therethrough the radio energy being caused to be unreflected when the incident energy frequency falls within preselected narrow limits and normally to be reflected for other frequencies not harmonics thereof, other blades of the propeller being reflective at all frequencies incident thereon, whereby selective reflection differences between the blades is confined to said limits.

References Cited in the file of this patent

UNITED STATES PATENTS

| | | |
|---|---|---|
| 1,370,093 | Crouse et al. | Mar. 1, 1921 |
| 1,576,730 | Harth | Mar. 16, 1926 |
| 2,212,110 | Beuermann | Aug. 20, 1940 |
| 2,293,839 | Linder | Aug. 25, 1942 |
| 2,349,440 | Lavoie | May 23, 1944 |
| 2,443,643 | Schelleng | June 22, 1948 |
| 2,462,102 | Istvan | Feb. 22, 1949 |
| 2,464,006 | Tiley | Mar. 8, 1949 |
| 2,472,212 | Hudspeth | June 7, 1949 |
| 2,472,782 | Albersheim | June 14, 1949 |

FOREIGN PATENTS

| | | |
|---|---|---|
| 802,728 | France | Sept. 14, 1936 |
| 694,523 | Germany | July 4, 1940 |